United States Patent
Koza et al.

(10) Patent No.: US 12,496,009 B2
(45) Date of Patent: Dec. 16, 2025

(54) SYSTEM FOR VISUALIZING PATIENT STRESS

(71) Applicant: DENTSPLY SIRONA Inc., York, PA (US)

(72) Inventors: André Koza, Worms (DE); Ronny Kucharczyk, Worms (DE)

(73) Assignee: Dentsply Sirona, Inc., York, PA (US)

(*) Notice: Subject to any disclaimer, the term of this patent is extended or adjusted under 35 U.S.C. 154(b) by 862 days.

(21) Appl. No.: 17/427,115

(22) PCT Filed: Jan. 27, 2020

(86) PCT No.: PCT/EP2020/051879
§ 371 (c)(1),
(2) Date: Jul. 30, 2021

(87) PCT Pub. No.: WO2020/156979
PCT Pub. Date: Aug. 6, 2020

(65) Prior Publication Data
US 2022/0096004 A1  Mar. 31, 2022

(30) Foreign Application Priority Data
Jan. 30, 2019  (EP) .................................. 19000054

(51) Int. Cl.
*A61B 5/00* (2006.01)
*A61B 5/01* (2006.01)
(Continued)

(52) U.S. Cl.
CPC .............. *A61B 5/4824* (2013.01); *A61B 5/01* (2013.01); *A61B 5/021* (2013.01); *A61B 5/024* (2013.01);
(Continued)

(58) Field of Classification Search
CPC ......... A61B 5/4824; A61B 5/01; A61B 5/021; A61B 5/024; A61B 5/0816; A61B 5/24;
(Continued)

(56) References Cited

U.S. PATENT DOCUMENTS 4,127,121 A * 11/1978 Westenskow ....... A61M 16/104
                                                      128/203.14
7,914,420 B2    3/2011 Daly
(Continued)

FOREIGN PATENT DOCUMENTS

CN    106725509 A    5/2017
EP     0748611 A2   12/1996
(Continued)

OTHER PUBLICATIONS

Japanese Office Action dated Oct. 24, 2023 (English Translation).
(Continued)

*Primary Examiner* — Said Broome
*Assistant Examiner* — Andrew Shin
(74) *Attorney, Agent, or Firm* — SCHWEGMAN LUNDBERG & WOESSNER, P.A.

(57) ABSTRACT

A system for visualizing patient stress or discomfort during dental treatment. By visualizing a patients changing stress conditions during treatment, a clinician may react accordingly such as by stopping a treatment activity, slowing a treatment activity, refreshing anesthesia, etc. in order to improve the patients experience.

11 Claims, 3 Drawing Sheets

(51) Int. Cl.
*A61B 5/021* (2006.01)
*A61B 5/024* (2006.01)
*A61B 5/08* (2006.01)
*A61B 5/24* (2021.01)

(52) U.S. Cl.
CPC .............. *A61B 5/0816* (2013.01); *A61B 5/24* (2021.01); *A61B 5/742* (2013.01)

(58) Field of Classification Search
CPC ..... A61B 5/742; A61B 5/743; A61B 5/14517; A61B 5/14546; A61B 5/4884; A61B 5/165; A61B 5/4266; A61B 5/7465
See application file for complete search history.

(56) References Cited

U.S. PATENT DOCUMENTS

| | | | |
|---|---|---|---|
| 2002/0082498 A1 | 6/2002 | Wendt | |
| 2007/0058035 A9 | 3/2007 | Hidehiro | |
| 2012/0289788 A1* | 11/2012 | Jain | A61B 5/165 702/19 |
| 2013/0150684 A1* | 6/2013 | Cooner | A61B 5/4082 600/595 |
| 2013/0166317 A1 | 6/2013 | Beardall et al. | |
| 2014/0039275 A1* | 2/2014 | Chang | A61B 5/02055 600/301 |
| 2015/0170546 A1* | 6/2015 | Kirenko | G09B 23/30 434/265 |
| 2015/0306340 A1* | 10/2015 | Giap | A61B 6/46 600/301 |
| 2016/0191887 A1 | 6/2016 | Casas | |
| 2017/0000677 A1 | 1/2017 | Prince | |
| 2017/0069120 A1 | 3/2017 | Benner | |
| 2017/0119304 A1* | 5/2017 | Jeanne | A61B 5/1135 |
| 2017/0202633 A1 | 7/2017 | Liu | |
| 2018/0032130 A1 | 2/2018 | Meglan | |
| 2018/0033261 A1 | 2/2018 | Mayers | |
| 2018/0082480 A1 | 3/2018 | White | |
| 2018/0120947 A1 | 5/2018 | Wells et al. | |
| 2018/0168781 A1 | 6/2018 | Kopelman et al. | |
| 2019/0206134 A1* | 7/2019 | Devam | G06F 3/011 |
| 2021/0186658 A1* | 6/2021 | Salah | A61C 7/002 |

FOREIGN PATENT DOCUMENTS

| | | |
|---|---|---|
| EP | 1470791 | 10/2004 |
| EP | 2374883 A1 | 10/2011 |
| EP | 3274883 | 1/2018 |
| EP | 3689229 | 9/2025 |
| JP | 2003310584 A | 11/2003 |
| WO | 2017151778 A1 | 9/2017 |
| WO | 2018085510 A1 | 5/2018 |
| WO | 2018165767 | 9/2018 |
| WO | 2020156979 | 8/2020 |

OTHER PUBLICATIONS

International Search Report; PCT/EP2020/051879; Mar. 17, 2020 (completed); Mar. 25, 2020 (mailed).
International Preliminary Report on Patentability; PCT/EP2020/051879; Mar. 17, 2020 (completed); Mar. 25, 2020 (mailed).
Written Opinion of the International Searching Authority; ; PCT/EP2020/051879; Mar. 17, 2020 (completed); Mar. 25, 2020 (mailed).
Chinese Office Action dated Oct. 26, 2023 (English Translation).
"European Application Serial No. 19000054.7, Extended European Search Report mailed Jun. 25, 2019", 10 pgs.
"Korean Application Serial No. 10-2021-7018064, Notice of Preliminary Rejection mailed Feb. 24, 2025", w/ English Translation, 21 pgs.
"Canadian Application Serial No. 3,117,888, Office Action mailed Jan. 30, 2025", 4 pgs.
"Canadian Application Serial No. 3,117,888, Response filed May 23, 2025 to Office Action mailed Jan. 30, 2025", 18 pgs.
"European Application Serial No. 19000054.7, Communication Pursuant to Article 94(3) EPC mailed May 3, 2023", 7 pgs.
"Korean Application Serial No. 10-2021-7018064, Response filed Apr. 11, 2025 to Notice of Preliminary Rejection mailed Feb. 24, 2025", W/English Claims, 29 pgs.
"Brazil Application Serial No. BR112021008025-2, Office Action mailed Sep. 11, 2025", w Informal English Translation, 5 pgs.

* cited by examiner

SYSTEM FOR VISUALIZING PATIENT STRESS

CROSS-REFERENCE TO RELATED APPLICATIONS

This is a National Phase application of International Application No. PCT/EP2020/051879, filed Jan. 27, 2020, which claims the benefit of and priority to EP application Ser. No. 19/000,054.7, filed on Jan. 30, 2019, which are herein incorporated by reference for all purposes.

FIELD OF THE INVENTION

The present application relates generally to a method, a system and computer readable storage media for visualizing patient stress and, more particularly, to a method, system and computer readable storage media for visualizing a patient's changing stress conditions during treatment such that a clinician may adopt mitigative measures in order to improve the patient's experience.

BACKGROUND OF THE INVENTION

Various options exist for treating dental defects such as by the use of restorations as well as the placement of dental implants using physical guides/sleeves and restorations to restore tooth functions.

Clinicians may create a treatment plan and use dental instruments such as dental drills, dental lasers, and endodontic instruments to provide treatment. During such treatments, the patient may experience varying degrees of pain or discomfort based on, for example, tooth sensitivity and proximity of a treatment area to nerves/blood vessels. A patient experiencing pain may not be able to easily express such pain due to his/her buccal cavity being held open for treatment purposes. Clinicians may ask the patient to nod their heads, raise their hand, tap on the clinician, etc. if experiencing pain. However, this manual process may be inefficient as treatments usually require a patient to be still. Moreover, a focused clinician may not notice such gestures in time. There is therefore a need to automatically provide information about changing patient stress/discomfort to a clinician in a view direction or vicinity of the clinician in order for the clinician to adapt accordingly and improve patient experience without having to monitor a device that is out of view or reach.

European Patent EP0748611A2 discloses a heart function monitoring system applied to dental apparatus such as dental units consisting of a base supporting a first column, placed beside a chair, and a first main holder for dental instruments; there being also envisaged on the said dental unit a plurality of sensors designed to detect an electrocardiographic signal, applied to parts of the body of a patient and forming part of an electrocardiograph. It is incorporated by reference for background disclosure purposes.

U.S. patent application Ser. No. 15/656,701 discloses a notification system for providing feedback from a patient to a dentist, the system including a notification panel mounted in proximity to a dental chair and an activation device. The activation device may be a hand-held device, such as a wireless remote, or may be mounted near the dental chair. The activation device may include one or more switches for activation by the patient. Each switch may correspond to a condition being experienced by the patient, such as pain, discomfort, or the need for suction. During a dental procedure, the switches may be activated by the patient to request a corresponding action by the dentist.

U.S. patent application Ser. No. 14/977,258 discloses a Mobile Dental Intelligence Center (MobiDIC) that may roll up alongside a patient's Bedside or Chairside where oral hygiene may be performed by the patient's caregiver, with no need to have a sink or basin in the area. Using the MobiDIC the caregiver may be able to brush the patient's teeth, rinse and suction the patient's mouth as well as monitor the patients Vital Signs.

US Patent Application No. 2017202633 discloses an imaging and display system for guiding medical interventions comprising a wearable display for viewing by a user wherein the display presents a composite, or combined image that includes pre-operative surgical navigation images, intraoperative images, and in-vivo microscopy images or sensing data. A probe, such as a microscopy probe or a sensing probe, may be used to acquire in-vivo imaging/sensing data from the patient and the intra-operative and in-vivo images may be acquired using tracking and registration techniques to align them with the pre-operative image and the patient to form a composite image for display.

US Patent Application No. 20020082498 discloses a method for image-guided surgery comprising capturing 3-dimensional (3D) volume data of a portion of a patient, processing the volume data so as to provide a graphical representation of the data, capturing a stereoscopic video view of a scene including a portion of said patient, rendering the graphical representation and the stereoscopic video view in a blended manner so as to provide a stereoscopic augmented image, and displaying said stereoscopic augmented image in a video-see-through display.

US Patent Application Publication No. 20160191887 describes a real-time surgery navigation method and apparatus for displaying an augmented view of a patient from a static or dynamic viewpoint of a surgeon. A surface image, a graphical representation of the internal anatomic structure of the patient processed from preoperative or intraoperative images, and a computer geometrically registering both images may be used. Responsive to geometrically registering the images, a head mounted display may present to a surgeon an augmented view of the patient.

SUMMARY OF THE INVENTION

Existing limitations associated with the foregoing, as well as other limitations, can be overcome by the system according to claim 1 for the visualization of patient stress during treatment.

In an aspect herein, the present invention provides a method utilizing augmented visualization, the method comprising: providing a biopotential sensor system adapted to retrieve patient biopotential information; obtaining said patient biopotential information from the biopotential sensor; analyzing said patient biopotential information to obtain a treatment regimen; and overlaying the patient biopotential information and/or the treatment regimen as an augmentation on a predetermined site through an augmented reality device such that the patient biopotential information appears directly superimposed on said predetermined site.

In another aspect herein, the method further comprises one or more of the steps: (i) further comprising analyzing the patient biopotential information to obtain a change in the patient biopotential information by comparing a first biopotential data corresponding to the patient's stress/discomfort level at a first time period to a biopotential data corresponding to the patient's stress/discomfort level at a second time period, (ii) wherein the first time period is a time period selected before treatment begins and the second time period is a time period selected after treatment begins, (iii) further comprising providing the treatment regimen based on said change in the patient biopotential information, (iv) wherein said predetermined site is a site selected from the group consisting of the patient, a region of the patient, or site in a field of view of a user of the augmented reality device, (v) wherein said patient biopotential information is obtained in real-time, (vi) wherein said patient biopotential information includes information selected from the group consisting of heart rate, blood volume pulse, cortisol levels in sweat, a signal that corresponds to the patient's heart rate and a signal that corresponds to a stress level of the patient, (vii) further comprising; updating the augmentation based on data selected from the group consisting of (a) real time data tracking changes in patient biopotential information (b) real time data tracking clinician movements and (c) real time data tracking patient movements.

In another aspect, a system is provided, the system utilizing augmented visualization, the system comprising; an augmented reality device, a biopotential sensor system adapted to retrieve patient biopotential information; and at least one processor configured to perform the steps of; obtaining said patient biopotential information from the biopotential sensor; analyzing said patient biopotential information to obtain a treatment regimen; and overlaying the patient biopotential information and/or the treatment regimen as an augmentation on a predetermined site through the augmented reality device such that the patient biopotential information appears directly superimposed on said predetermined site.

In another aspect herein, the system further comprises one or more of the configurations: (i) further comprising tracking system configured to offer real-time position data for a precise location, orientation and update of patient biopotential data and/or treatment regimen in a common coordinate system, (ii) wherein the tracking system is sensor based and/or vision based, (iii) wherein the biopotential sensor system includes an electrode sensor, a cortisol measuring sensor and/or a sensor that provides a signal that is the patient's heart rate or corresponds to the patient's heart rate or stress level, (iv) wherein the processor is further configured to: analyze the patient biopotential information to obtain a change in the patient biopotential information by comparing a first biopotential data corresponding to the patient's stress/discomfort level at a first time period to a biopotential data corresponding to the patient's stress/discomfort level at a second time period, (v) wherein the first time period is a time period selected before treatment begins and the second time period is a time period selected after treatment begins, (vi) further comprising providing the treatment regimen based on said change in the patient biopotential information, (vii) wherein said predetermined site is a site selected from the group consisting of the patient, a region of the patient, or site in a field of view of a user of the augmented reality device, (viii) wherein said patient biopotential information is obtained in real-time, (ix) wherein said patient biopotential information includes information selected from the group consisting of heart rate, blood volume pulse, cortisol levels in sweat, a signal that corresponds to the patient's heart rate and a signal that corresponds to a stress level of the patient, (x) wherein the processor is further configured to perform the step of; updating the augmentation based on data selected from the group consisting of (a) real time data tracking changes in patient biopotential information (b) real time data tracking clinician movements and (c) real time data tracking patient movements, (x) wherein the biopotential sensor system is a handheld device through which the patient manually registers his/or pain sensations and/or stress levels (xi) wherein the biopotential information and/or the treatment regimen are displayed on a mobile device, e.g. an iPad.

In yet another aspect, a method is provided, the method comprising: providing a biopotential sensor system adapted to retrieve patient biopotential information; obtaining said patient biopotential information from the biopotential sensor; analyzing said patient biopotential information to obtain a treatment regimen; and providing the patient biopotential information and/or the treatment as a visual, auditory or haptic output.

In even yet another aspect, a non-transitory computer-readable storage medium is provided, the non-transitory computer-readable storage medium storing a program which, when executed by a computer system, causes the computer system to perform a procedure comprising: providing a biopotential sensor system adapted to retrieve patient biopotential information; obtaining said patient biopotential information from the biopotential sensor; analyzing said patient biopotential information to obtain a treatment regimen; and overlaying the patient biopotential information and/or the treatment regimen as an augmentation on a predetermined site through an augmented reality device such that the patient biopotential information appears directly superimposed on said predetermined site.

BRIEF DESCRIPTION OF THE DRAWINGS

Example embodiments will become more fully understood from the detailed description given herein below and the accompanying drawings, wherein.

DETAILED DESCRIPTION OF THE INVENTION

In accordance with example aspects described herein, a method, system and computer readable storage media is provided for visualizing a patient's stress level using augmented reality and adopting mitigative measures in order to improve patient experience.

System for Visualizing Patient Stress

Figure 1:
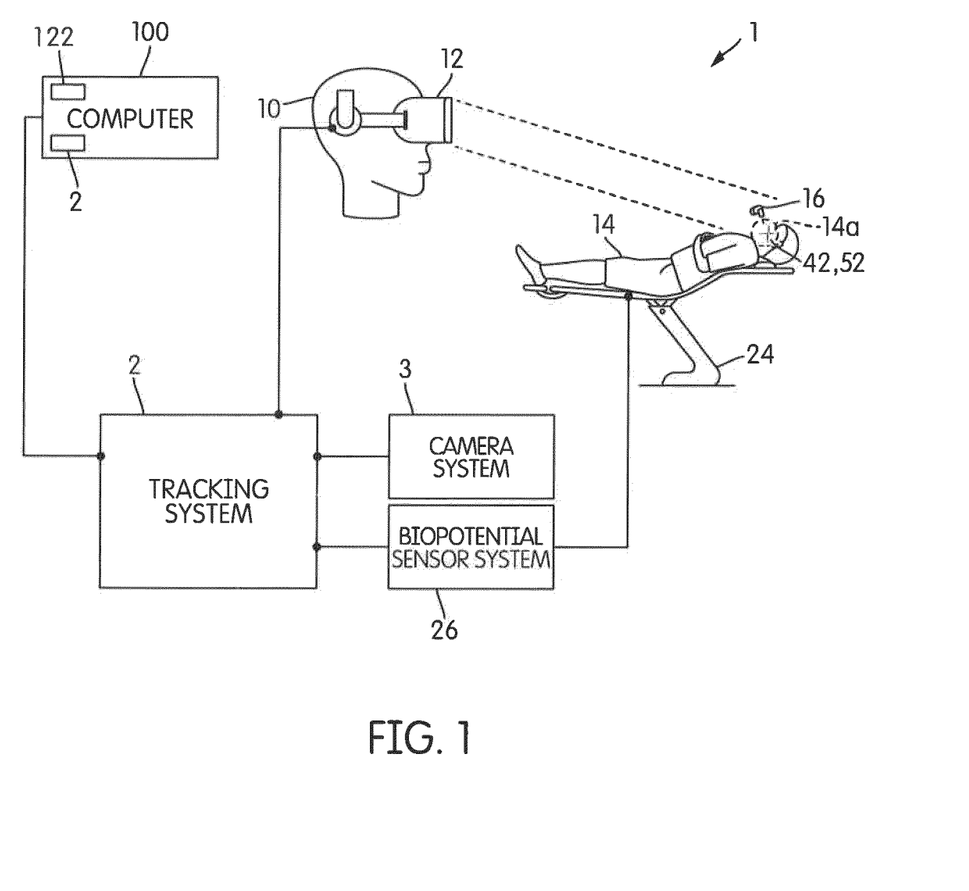
FIG. 1 is a block diagram illustrating a visualization system according to an embodiment of the present invention.

FIG. 1 illustrates a visualization system 1 comprising a display device 12 for augmented visualization such as head mounted augmented reality glasses, an HUD display, or a stereoscopic display capable of receiving stereoscopic video images, or otherwise display device 12 that may be used for overlaying patient biopotential information 42 (such as, for example heart rate, blood volume pulse, cortisol levels in sweat which may correspond to stress levels, or any other signal that corresponds to a patient's heart rate or to a change in stress levels) or otherwise patient biopotential information 42 in an augmented manner on a target site or on a stereoscopic video of the target site such that the biopotential information 42 appears to be superimposed on the target site. An example system measuring cortisol levels in sweat is described in the publication by Onur Parlak et al., entitled "Molecularly selective nanoporous membrane-based wearable organic electrochemical device for noninvasive cortisol sensing" Science Advances 20 Jul. 2018: Vol. 4, no. 7, ppl-10, which is incorporated by reference herein in its entirety, as if set forth fully herein.

The target site may include a patient 14, as the patient 14 is seated in a treatment chair 24 (e.g. dental treatment chair), a treatment site 14a on the patient 14 or on any suitable real world environment in a clinician's office, through augmented reality as discussed hereinafter. Alternatively the patient biopotential information may be displayed directly on a screen of a smart glass worn by the clinician without being superimposed in an augmented fashion. The patient biopotential information 42 may be analyzed to detect changes in a patient's stress level or discomfort, for example as compared to corresponding baseline data.

Figure 2:
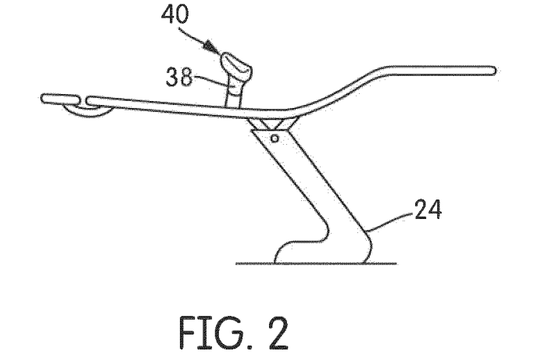
FIG. 2 illustrates a perspective view of a dental chair according to an exemplary computer system according to an embodiment of the present invention.

The display device 12 may be connected to or form part of a computer system 100. The computer system 100 (also shown in FIG. 3) may include a tracking system 2 and a processor 122. The tracking system 2 may alternatively be separate from the computer system and may form at least part of any of the devices, components, and/or systems discussed herein. The tracking system 2 may be electrically connected to a processor 122 and may offer real-time location data for a precise location and orientation of images and objects in a common coordinate system. In an exemplary embodiment herein, the tracking system may be sensor based e.g. as a biopotential sensor system 26 to track the patient's biopotential information 42. To measure the heart rate of a patient 14 (or a signal that may correspond to the patient's heart rate or stress/discomfort levels), the biopotential sensor system 26 may include a biopotential sensor interface (not shown) which may include a biopotential sensor or measurement device such as, for example, the electrode sensors 38 of FIG. 2, cortisol measuring sensor (not shown) or any other suitable device that provides a signal that is the patient's heart rate or corresponds to the patient's heart rate or stress level. The measuring device may also be configured to measure Electrodermal Activity (EDA) and Heart Rate variability (HRV) wherein a predetermined signal processing method may be used to extract significant features from the physiological signals in order to predict a type of stress of the patient thereby differentiating between serious stress (such as stress related to pain during dental treatment) related and non-serious stress (such as stress that is unrelated to pain during dental treatment). Significant features such as mean or magnitude of Skin Conductance Level (SCL) and Skin Conductance Response (SCR), features that may give a general idea of Heart rate activity and the spread of the values etc. may be selected to discriminate between serious stress and non-serious stress as disclosed in the Publication "Profiling visual and verbal stress responses using electrodermal heart rate and hormonal measures", by Pawel et al, which is herein incorporated by reference in its entirety, as if set forth fully herein. The measurement device may alternatively be a handheld device (not shown) through which the patient 14 may manually register pain sensations or stress level through, for example, clicking on a button on said handheld device. In an embodiment in which the biopotential sensor/measurement device is an electrode sensor 38, the electrode sensor may be mounted on a handle 40 of the treatment chair 24. The biopotential sensor interface (not shown) may be in communication with the tracking system 2 and/or computer system 100, the processor 122 of which may process output signals from the biopotential sensor system 26. The biopotential sensor interface may read (e.g., retrieve or receive) electrical signals corresponding to the biopotential signals generated by the user and may then send the signals to the tracking system 2 and/or computer system 100.

The tracking system may also be vision based, for example as cameras for visual tracking of the patient 14, features of the patient (such as the head or buccal cavity), and/or predetermined markers (not shown) placed on the patient 14. Said visual tracking may be achieved using, for example object/pattern recognition. A camera system 3 such as a 3D optical tracking system and/or stereoscopic camera system may be included in the computer system and/or may form or be a part of the tracking system 2. The camera system 3 may also be embedded in the display device 12 of the clinician 10. The camera system may operate under one of several depth sensing principles including, for example, (i) structural light, (ii) Time of Flight (ToF) and/or (iii) stereoscopic principles explained hereinafter. For cameras employing structural light, a light source may be used to project a known pattern onto the patient 14, and a receiver may detect the distortion of the reflected pattern to calculate depth map based on geometry. For cameras employing Time of Flight (ToF) principles, a light source may send out a pulse, and a sensor may detect a reflection of the pulse from the patient 14 in order to record it's time of flight. Knowing that and the constant speed of light, the system may calculate how far away the patient 14 is. Alternatively, a modulated light source may be sent, and a phase change of light reflected from the patient may be detected. For cameras employing stereoscopic principles, multiple cameras may be placed at different positions to capture multiple images of the patient, and a depth map may be calculated based on geometry. This depth information may be used to track the patient's location during treatment (e.g. during dental treatment).

In yet another embodiment, the tracking system may be a fusion of sensor based and vision based tracking system. A wireless protocol may be used to transmit known marker locations for tracking.

The processor 122 may be configured to receive real time patient biopotential data, to analyze said data and to display said analyzed data to the clinician 10 in an augmented manner by (i) overlaying the analyzed data in the real world environment through, for example, a display device 12 such as a see-through Augmented Reality Glasses/ HUD display or (ii) overlaying the analyzed data on a stereoscopic video of the patient using e.g. a head mounted stereoscopic display. Alternatively, the analyzed data may be displayed in a non-augmented manner, such as on a smart watch (not shown) or as an optical or audible output on an output device such as a monitor.

In so doing, the clinician 10 may receive real-time patient biopotential information 42 and may respond to the changing information by, for example, stopping a treatment activity, slowing down a treatment activity, refreshing anesthesia, etc. in order to improve the patient experience without losing focus of the treatment in order to "check in" with the patient.

In an exemplary embodiment of the present invention, the patient biopotential information 42 may optionally be overlaid on a treatment site 14a after a request is received from the clinician 10 through a user interface 126 of the computer system 100 (such as a gesture recognition system and/or a voice recognition system or the like) before or during drilling treatment procedure. Overlaying of the patient biopotential data 42 and/or analysis of the patient biopotential data, including, for example, a treatment regimen 52, on the patient 14 or treatment site 14a through the display 12 may be performed dynamically and in real time and may be achieved by the processor 122 working in tandem with the tracking system 2 wherein changes in position of (i) the patient 14 and/or (ii) the clinician 10, captured by the tracking system 2, may be translated into corresponding changes in positions of the overlaid patient biopotential data 42 such that said patient biopotential data 42 routed to a screen of the display device 12 appear directly superimposed on target regions/sites 14a (e.g. buccal cavity) of the patient 14 even as the patient 14 and/or or clinician 10 moves. Moreover, responsive to a request from the clinician 10 the processor may be configured to provide the ongoing or predetermined suggestions of alterations to a planned treatment procedure based on measured patient discomfort.

Computer System for Visualizing Patient Stress

Having described a system 1 for facilitating the communication of patient stress using augmented reality reference will now be made to FIG. 3, which shows a block diagram of a computer system 100 that may be employed in accordance with at least some of the example embodiments herein. Although various embodiments may be described herein in terms of this exemplary computer system 100, after reading this description, it may become apparent to a person skilled in the relevant art(s) how to implement the disclosure using other computer systems and/or architectures.

In one example embodiment herein, the computer system 100 may include at least one computer processor 122 and may include a tracking system 2, user interface 126 and input unit 130. The input unit 130 may be used by the clinician 10 along with a display unit 128 such as a monitor to send information to the computer processor 122. In one exemplary embodiment herein, the input unit 130 is a finger or stylus to be used on a touchscreen interface (not shown). The input unit 130 may alternatively be a gesture/voice recognition device, a trackball, a mouse or other input device such as a keyboard or stylus. In one example, the display unit 128, the input unit 130, and the computer processor 122 may collectively form the user interface 126. The computer processor 122 may include, for example, a central processing unit ("CPU"), a multiple processing unit, an application-specific integrated circuit ("ASIC"), a field programmable gate array ("FPGA"), or the like. The processor 122 may be connected to a communication infrastructure 124 (e.g., a communications bus, or a network). In an embodiment herein, the processor 122 may receive a request for patient biopotential information 42 and may obtain instructions concerning the request from one or more storage units of the computer system 100. The processor 122 may then load said instructions and execute the loaded instructions such as routing the patient biopotential data 42 to a screen of the display device 12 such that the patient biopotential data 42 is overlaid on the treatment site 14a such that said patient biopotential data 42 appears directly superimposed on said treatment site 14a. In yet another alternative embodiment of the present invention, the computer system may use projection based augmented reality systems wherein, for example, a projector and depth sensors, along with the tracking system 2 and/or markers on the patient 14 (e.g. hidden markers) may project the patient biopotential data 42 directly onto target sites 14a (e.g. buccal cavity) of the patient. Herein, a display 12 such as augmented reality glasses may not be needed.

Figure 4:
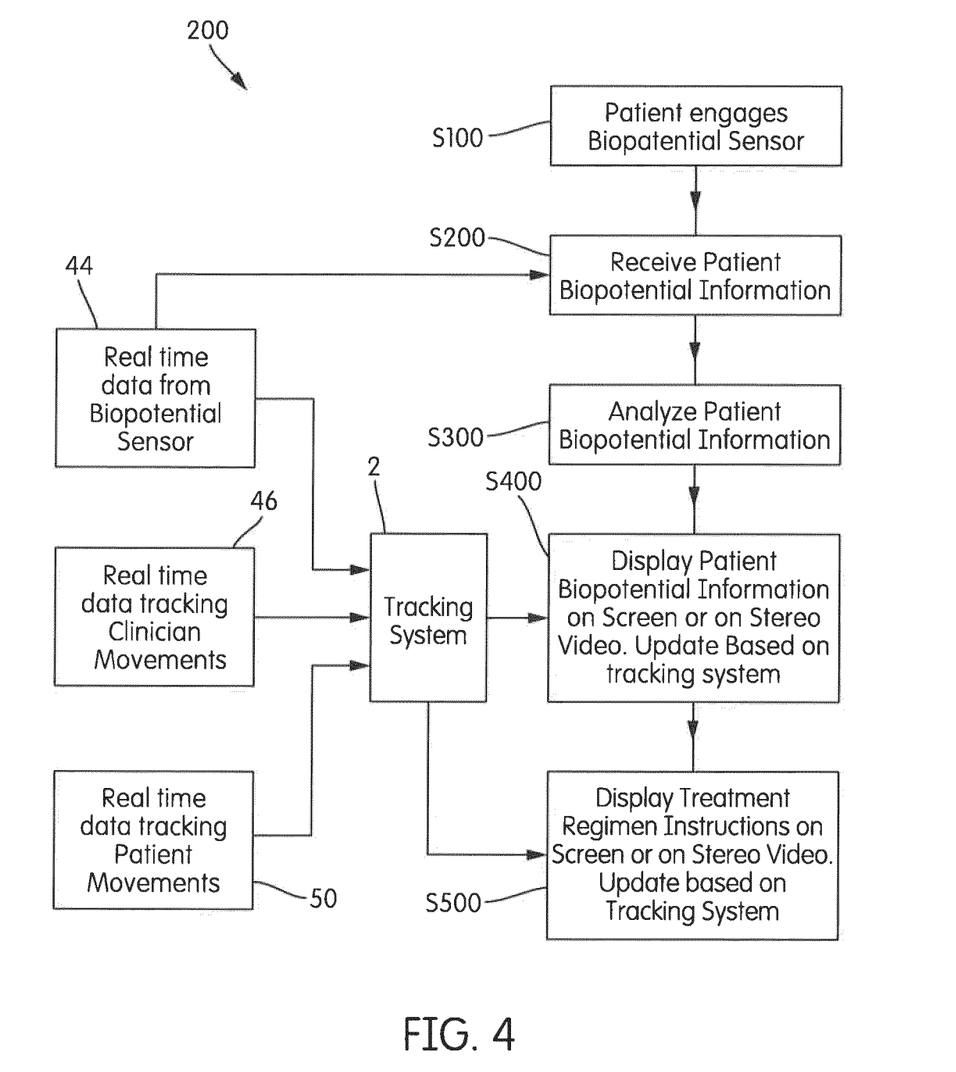
FIG. 4 is a flow chart showing a method according to an embodiment of the present invention.

One or more steps/procedures for visually communicating patient stress/discomfort may be stored on a non-transitory storage device in the form of computer-readable program instructions. To execute a procedure, the processor 122 loads the appropriate instructions, as stored on a storage device, into memory and then executes the loaded instructions as shown in FIG. 4 discussed hereinafter.

The computer system 100 may further comprise a main memory 132, which may be a random access memory ("RAM") and also may include a secondary memory 134. The secondary memory 134 may include, for example, a hard disk drive 136 and/or a removable-storage drive 138 (e.g., a floppy disk drive, a magnetic tape drive, an optical disk drive, a flash memory drive, and the like). The removable-storage drive 138 may read from and/or write to a removable storage unit 140 in a well-known manner. The removable storage unit 140 may be, for example, a floppy disk, a magnetic tape, an optical disk, a flash memory device, and the like, which may be written to and read from by the removable-storage drive 138. The removable storage unit 140 may include a non-transitory computer-readable storage medium storing computer-executable software instructions and/or data.

In further alternative embodiments, the secondary memory 134 may include other computer-readable media storing computer-executable programs or other instructions to be loaded into the computer system 100. Such devices may include a removable storage unit 144 and an interface 142 (e.g., a program cartridge and a cartridge interface); a removable memory chip (e.g., an erasable programmable read-only memory ("EPROM") or a programmable read-only memory ("PROM")) and an associated memory socket; and other removable storage units 144 and interfaces 142 that allow software and data to be transferred from the removable storage unit 144 to other parts of the computer system 100.

The computer system 100 also may include a communications interface 146 that enables software and data to be transferred between the computer system 100 and external devices. Such an interface may include a modem, a network interface (e.g., an Ethernet card or an IEEE 802.11 wireless LAN interface), a communications port (e.g., a Universal Serial Bus ("USB") port or a FireWire® port), a Personal Computer Memory Card International Association ("PCM-CIA") interface, Bluetooth®, and the like. Software and data transferred via the communications interface 146 may be in the form of signals, which may be electronic, electromagnetic, optical or another type of signal that may be capable of being transmitted and/or received by the communications interface 146. Signals may be provided to the communications interface 146 via a communications path 148 (e.g., a channel). The communications path 148 may carry signals and may be implemented using wire or cable, fiber optics, a telephone line, a cellular link, a radio-frequency ("RF") link, or the like. The communications interface 146 may be used to transfer software or data or other information between the computer system 100 and a remote server or cloud-based storage (not shown).

One or more computer programs or computer control logic may be stored in the main memory 132 and/or the secondary memory 134. The computer programs may also be received via the communications interface 146. The computer programs may include computer-executable instructions which, when executed by the computer processor 122, cause the computer system 100 to perform the methods as described hereinafter.

In another embodiment, the software may be stored in a non-transitory computer-readable storage medium and loaded into the main memory 132 and/or the secondary memory 134 of the computer system 100 using the removable-storage drive 138, the hard disk drive 136, and/or the communications interface 146. Control logic (software), when executed by the processor 122, causes the computer system 100, and more generally the system for augmented reality visualization, to perform all or some of the methods described herein.

Implementation of other hardware arrangement so as to perform the functions described herein will be apparent to persons skilled in the relevant art(s) in view of this description.

Method for Visualizing Patient Stress

Figure 3:
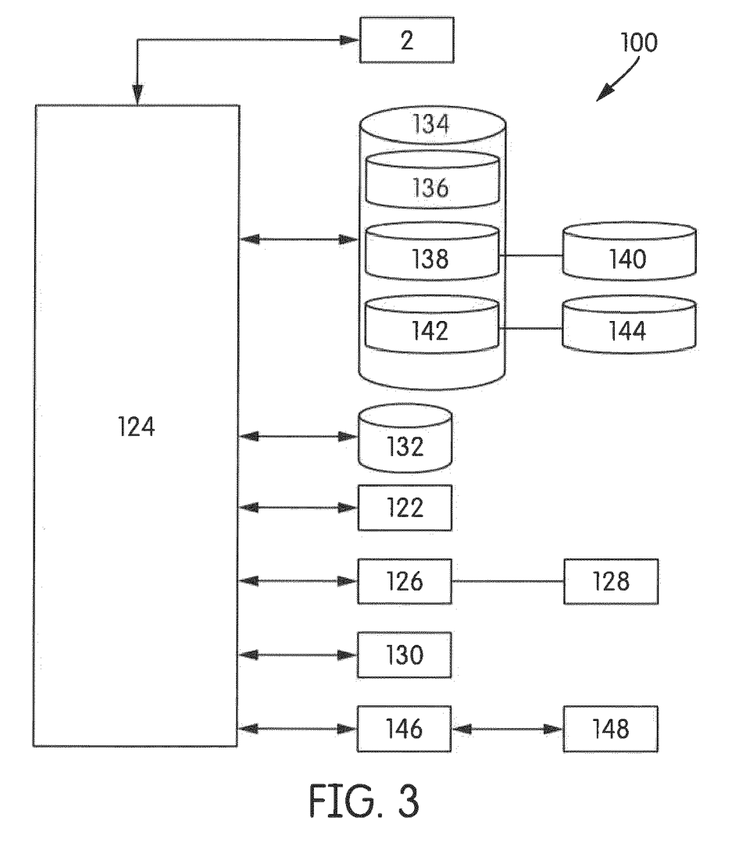
FIG. 3 illustrates a block diagram showing a computer system of the present invention.

Having described the computer system 100 of FIG. 3, methods for Visualizing Patient Stress will now be further described in conjunction with FIG. 4 which show steps for acquiring patient biopotential information 42 via sensors and displaying them on smart devices to improve the treatment and the patient experience.

FIG. 4 shows a process 200 for visualizing patient stress. The process may start when a patient 14 engages a biopotential sensor system 26 (such as one including an electrode sensor 38 which may be attached to a handle of a treatment chair 24) in Step S100. Patient biopotential information 42 may be requested or received in Step S200 from the electrode sensor 38. Upon receipt of the patient biopotential information 42, which may initially be in a raw format such as an analog format, the data may be converted into a readable format such as a digital format. The data may then be analyzed in Step S300. Said analysis may involve obtaining baseline biopotential information corresponding to the patient's stress/discomfort level before dental treatment begins. Said information may then be routed to a screen of the display unit 12 such that the information appears directly superimposed on the patient 14 or a treatment site 14a in an augmented manner (Step S400). Using data from the tracking system 2 including, for example, (i) real time data tracking changes in patient biopotential information 44 (ii) real time data tracking clinician movements 46, and/or (iii) real time data tracking patient movements 50, the augmented data routed to the display device 12 may be dynamically updated in real time for overlay on the patient 14 or treatment site 14a or otherwise any other predetermined real world site in a field of view of the clinician 10 such that said augmentation appears directly superimposed on said site. Said predetermined site may be recognized using, for example, object recognition on data obtained from the camera system 3.

In an exemplary embodiment of the present invention, the augmentation, at least including patient biopotential information 42 may be constantly updated. Alternately, the augmentation may be updated intermittently, for example, when the patient biopotential information 42 exceeds a predetermined value. In a further exemplary embodiment of the present invention, retrieval of the patient biopotential information 42 from the biopotential sensor system 26 may be terminated for a duration of time and said retrieval may thereafter be resumed upon a request from the clinician 10 to do so.

Moreover, instructions such as (i) predetermined instructions or suggestions for proceeding with dental treatment based on recorded changes in stress or discomfort levels and/or (ii) instructions based on artificial intelligence may be displayed automatically for the clinician 10 or upon a request such as a request from the clinician 10 through the input unit 130. More specifically, in Step S500, artificial intelligence data analysis may be used on images of the patient 14 taken by the camera system 3 and/or on a database of patient biopotential information 42 to generate a set instructions for the processor 122 to accurately or substantially accurately detect patient pain, stress or discomfort. The processor 122 may be adapted to execute one or more algorithms, such as artificial intelligence and/or other algorithms, which may include being adapted to execute algorithms based on one or more inputs, such as inputs derived from or otherwise based on ongoing patient treatments, past patient treatments, corresponding recorded stress levels, the results of patient treatments or otherwise treatment information. The processor 122 may be adapted to recommend or otherwise identify one or more treatment regimens 52 for one or more detected stress levels and display said treatment regimens 52 to the clinician 10. In an exemplary embodiment of the present invention, the treatment regimen 52 may include, for example, refreshing anesthesia, stopping a treatment activity, slowing down a treatment activity etc., in order to improve patient experience. Systems for employing artificial intelligence in treatment planning, such as are described in U.S. Pat. No. 9,788,917B2, entitled "Methods and systems for employing artificial intelligence in automated orthodontic diagnosis and treatment planning" which is hereby incorporated by reference herein in its entirety, as if set forth fully herein, may be used.

In yet another embodiment, the computer system 100 may be in communication with a tool 16 (e.g. dental drill) being used by the clinician 10 on the patient 14. Based on recorded patient biopotential data 42 exceeding a preferably predetermined threshold value, the computer system may obtain control of the tool 16 and may deactivate the tool 16 or reduce power sent to said tool 16.

Moreover, treatment regimens 52 may be provided to the clinician on the display device 12 in one or more forms including (a). visual form wherein for example red-yellow-green lights, colored lights or otherwise lights indicate real time stress/discomfort levels of the patient 10 (b). auditory form wherein for example verbal queues or other audible sounds may be activated indicating real time stress/discomfort levels of the patient, and/or (c) haptic form wherein for example an intensity of vibration of vibrating element (not shown) increases or decreases as recorded stress levels approach a predetermined value.

In view of the foregoing description, it may be appreciated that the example embodiments described herein provide a method, system and computer readable storage media for visualizing patient stress/discomfort levels.

Unless otherwise defined, all technical and scientific terms used herein have the same meaning as commonly understood by one of ordinary skill in the art to which this invention belongs. Although methods and materials similar to or equivalent to those described herein may be used in the practice or testing of the disclosure, suitable methods and materials are described above. All publications, patent applications, patents, and other references mentioned herein are incorporated by reference in their entirety to the extent allowed by applicable law and regulations. The disclosure may be embodied in other specific forms without departing from the spirit or essential attributes thereof, and it may therefore be desired that the present embodiment be considered in all respects as illustrative and not restrictive. Any headings utilized within the description are for convenience only and have no legal or limiting effect.

The invention claimed is:

1. A system comprising:
a display device for augmented visualization;
a biopotential sensor system adapted to retrieve patient biopotential information of a patient; and
at least one processor configured to:
   obtain the patient biopotential information from the biopotential sensor system:
   analyze the patient biopotential information to obtain a treatment regimen,
   overlay the patient biopotential information and the treatment regimen as an augmentation on a predetermined site of the patient through the display device for augmented visualization such that the patient biopotential information and the treatment regimen appears directly superimposed on the predetermined site of the patient;
   obtain, using artificial intelligence, an updated treatment regimen based on changes in the patient biopotential information, wherein the updated treatment regimen includes restoring anesthesia, stopping therapeutic activity, or slowing therapeutic activity based on changes in the patient biopotential information to take mitigating measures during dental treatment to improve patient experience; and
   update the augmentation to display the updated treatment regimen, based on data selected from the group consisting of: (i) real-time data tracking changes in the patient biopotential information, (ii) real-time data tracking clinician movements, and (iii) real-time data tracking patient movements, wherein the biopotential sensor system comprises a handheld device through which the patient manually registers pain sensations or stress levels.

2. The system according to claim 1, wherein the at least one processor is further configured to analyze the patient biopotential information to obtain a change in the patient biopotential information by comparing a first biopotential data corresponding to a first stress/discomfort level of the patient at a first time period to a second biopotential data corresponding to a second stress/discomfort level of the patient at a second time period.

3. The system according to claim 2, wherein the first time period is a time period selected before treatment begins and the second time period is a time period selected after treatment begins.

4. The system according to claim 1, wherein the predetermined site is a site selected from the group consisting of the patient, a region of the patient, or site in a field of view of a user of the display device.

5. The system according to claim 1, wherein the patient biopotential information is obtained in real-time.

6. The system according to claim 1, wherein the patient biopotential information includes information selected from the group consisting of heart rate, blood volume pulse, cortisol levels in sweat, blood pressure, breathing frequency, body temperature, a signal that corresponds to the patient's heart rate, and a signal that corresponds to a stress level of the patient.

7. The system according to claim 1, further comprising a tracking system configured to offer real-time position data for a precise location, orientation and update of the patient biopotential information or treatment regimen in a common coordinate system, wherein the tracking system is sensor based or vision based.

8. The system according to claim 1, wherein the biopotential sensor system includes an electrode sensor, a cortisol measuring sensor, a blood pressure sensor, a breathing frequency sensor, a body temperature sensor or a sensor that provides a signal that is the patient's heart rate or corresponds to the patient's heart rate or stress level.

9. The system according to claim 1, wherein the at least one processor is configured to:
   monitor the patient biopotential information;
   detect when the patient biopotential information exceeds a threshold; and
   update the augmentation in response to detecting that the patient biopotential information exceeded the threshold.

10. The system of claim 9, wherein the at least one processor is configured to:
   suspend monitoring of the patient biopotential information after updating the augmentation, until a user requests resuming the monitoring.

11. The system according to claim 1, wherein the at least one processor is configured to:
   monitor the patient biopotential information;
   detect when the patient biopotential information exceeds a threshold; and
   transmit a control signal to a dental tool in use during the treatment regimen, the control signal to reduce power to the dental tool or deactivate the dental tool.

* * * * *